Dec. 18, 1945.  J. H. HUTTON  2,391,243
CENTER OF GRAVITY LOCATION INDICATOR
Filed July 16, 1943  2 Sheets-Sheet 1
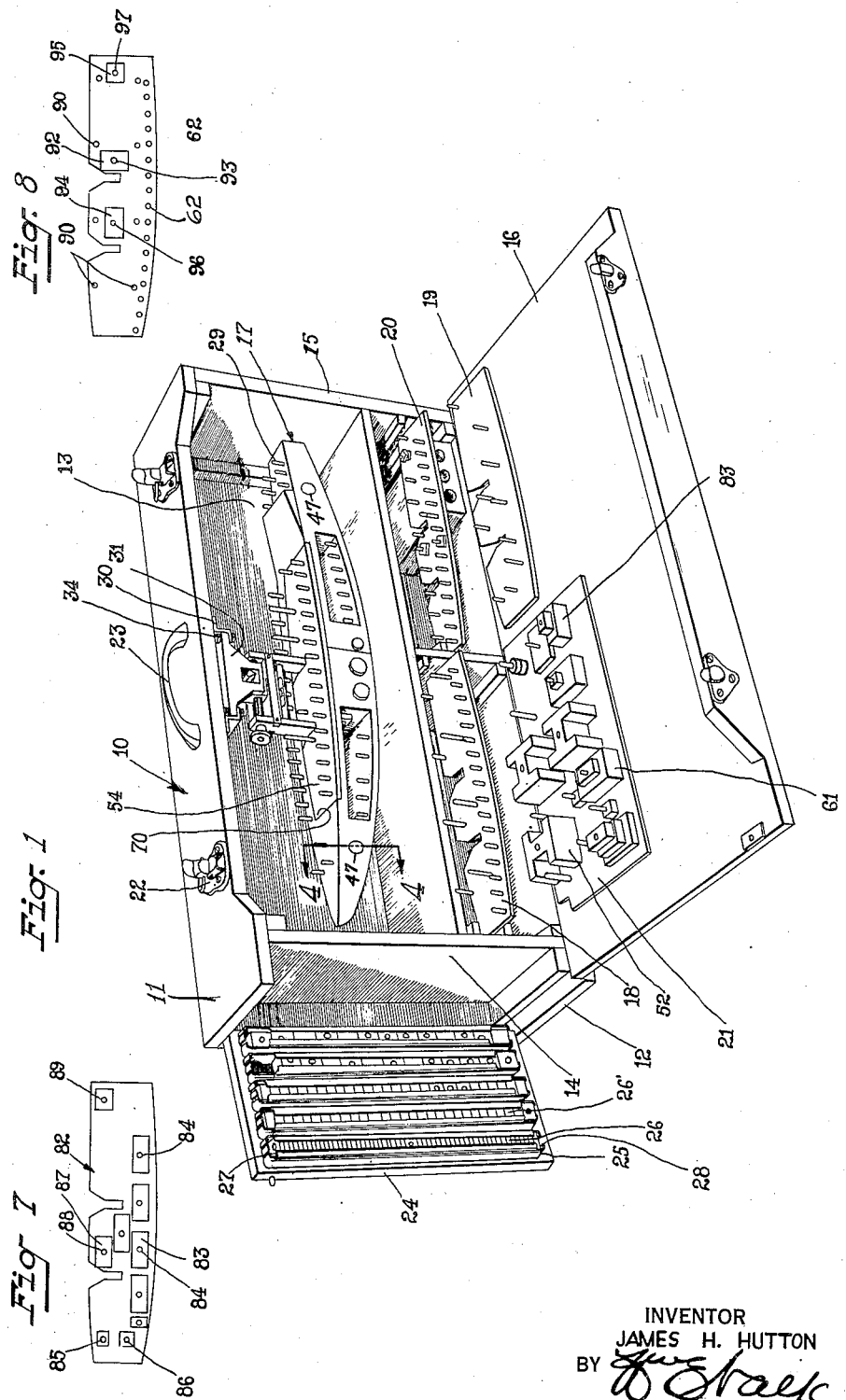
INVENTOR
JAMES H. HUTTON
BY
ATTORNEY Dec. 18, 1945. J. H. HUTTON 2,391,243
CENTER OF GRAVITY LOCATION INDICATOR
Filed July 16, 1943 2 Sheets-Sheet 2
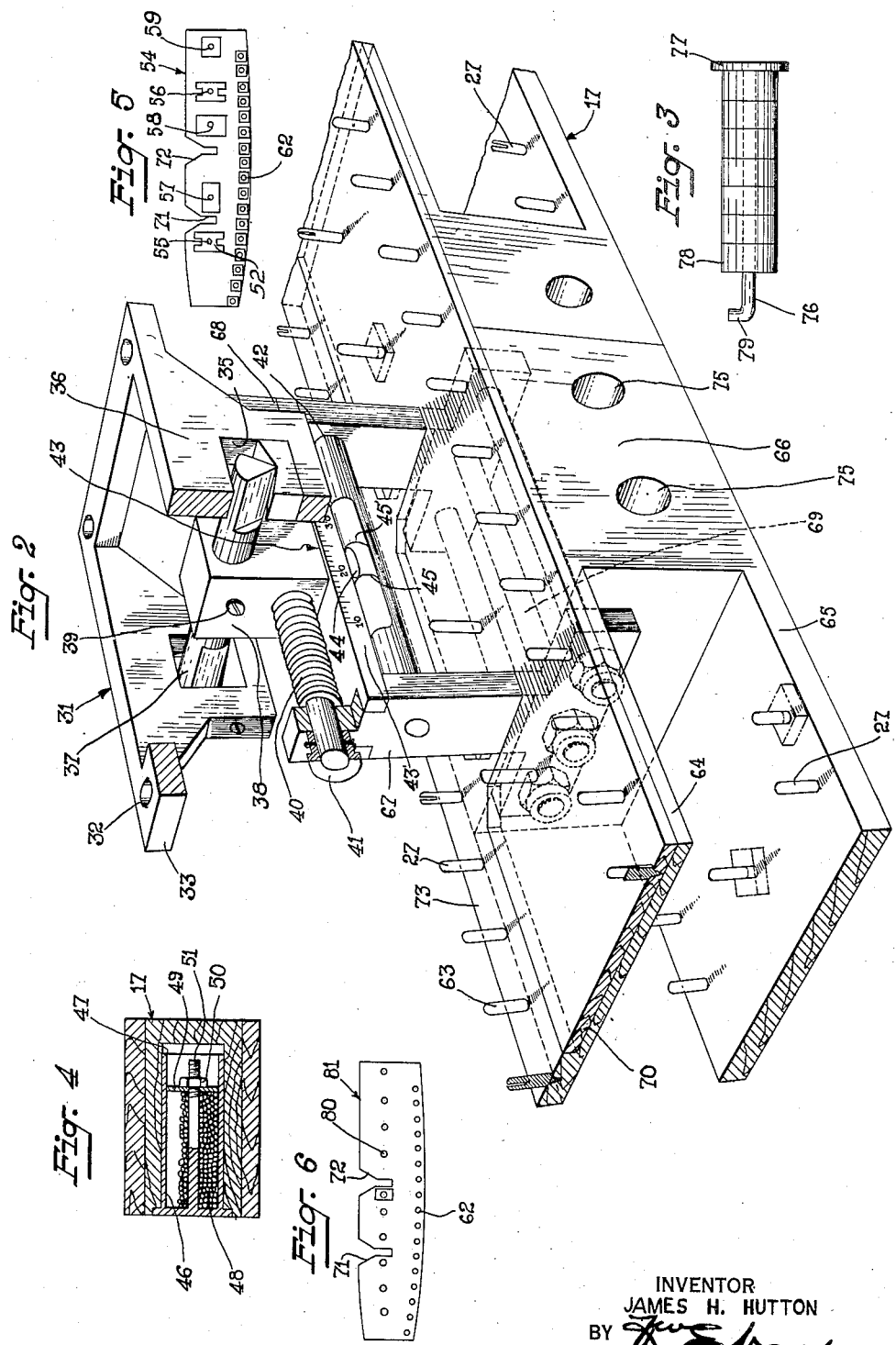
INVENTOR
JAMES H. HUTTON
BY
ATTORNEY Patented Dec. 18, 1945

2,391,243

UNITED STATES PATENT OFFICE 2,391,243

CENTER-OF-GRAVITY LOCATION INDICATOR

James H. Hutton, Kenmore, N. Y., assignor to Curtiss-Wright Corporation, a corporation of Delaware Application July 16, 1943, Serial No. 495,003

3 Claims. (Cl. 235—61)

This invention relates to balance indicators and more particularly to devices for determining the center of gravity location for an actual airplane.

It is an object of the present invention to provide a balance indicator which can be adjusted for use on its fulcrum support regardless of whether the fulcrum support is resting on a horizontal or inclined surface whereby the device may be used as well in an airplane as on the ground in a level location.

It is another object of the present invention to provide a device with a plurality of separable platforms, each of which has a different loading pattern wherein the same device serves for several loading arrangements and wherein once the weights have been disposed on the platform, they can be removed from the model structure of the airplane along with the platform, thereby avoiding the necessity of having to remove each one of the weights separately.

According to the present invention a model structure of proportionate weight and center of gravity location as an actual airplane is connected to a fulcrum support such that it can be balanced on the support for use in taking center of gravity readings regardless of whether or not the support rests in a horizontal or inclined position. On the fulcrum support is a knife edge device having a threaded opening running transversely of its axis in which there is operated an adjusting screw. This adjusting screw is manually operable through the opening and serves to connect the model structure with the knife edge proper. By adjustment of this screw the model structure can be properly balanced, as determined from a leveling bulb device mounted on the same. The model structure has a recess adapted to receive platforms of different loading patterns. A platform can be loaded at a location removed from the model structure and simply inserted in the recess on the model structure upon a platform which may already be on the model structure being removed. The fulcrum support takes the form of a box adapted to house the model structure when not in use. The model structure is removably suspended from a top portion of the support by means of a removable bracket on which the knife edge rests. Also within the support there are compartments for the storage of platforms and miscellaneous weights so that they may be carried around with the model structure and be readily available at all times. All of the weights have holes in them to fit over vertically extending pins located respectively at stations of loading on the platforms and on the main body of the model structure. A suitable scale from which the center of gravity reading is taken, is provided on the model structure. If, after the screw adjustment is made and the model with its load is balanced, this scale and a suitable index mark register at a center of gravity value outside of the 20 to 30 range on the scale indicia, the load has to be readjusted.

For other objects and for a better understanding of the invention, reference may be had to the following detailed description taken in connection with the accompanying drawings, in which Fig. 1 is a perspective view of a device embodying the features of the present invention.

Fig. 2 is an enlarged fragmentary and perspective view of the model structure, the adjusting screw, the knife edge, and the supporting bracket for connecting the same to the main support.

Fig. 3 is a view of the weight retaining element on which weights representing fuel tank loads are disposed.

Fig. 4 is an enlarged sectional view taken in the region 4—4 of Fig. 1 and showing the balancing ballast receiving container used for initially balancing the structure.

Figs. 5, 6, 7, and 8 are respectively plan views of task force, troop transport, long range and hospital platforms with their weights thereon.

Referring now particularly to Fig. 1, there is shown a fulcrum support 10 having a top portion 11 and a bottom portion 12. These top and bottom portions are coupled with side portions 13, 14, and 15, and a hinged cover 16 to provide an enclosure for the airplane model 17 and extra platforms 18, 19, and 20 as well as a weight stand 21. When the cover 16 is folded upwardly and locked with the top portion 11 by means of fasteners 22, the model structure 17, the platforms, and the weight stand 21 can be carried off as a unit by a handle 23. Adjacent the side portion 14 is a hinged door 24 on which there are disposed weight racks 25 adapted to store miscellaneous small weights 26, 26'. The weights 26 and 26' are inserted at the top of the rack through an opening 27 and a similar weight can be removed at the bottom of the rack through opening 28. Each of these weights has holes through the same adapted to fit over any of the various vertically extending station pins 29 on the model structure and on the various loading platforms.

Connected to the top portion 11 by means of angle elements 30 is a fulcrum support 31. This support 31 has holes 32 extending vertically through a flange 33 thereof for the purpose of receiving fastening bolts 34 adapted to fasten the support 31 to the angle elements 30. Upon removal of these bolts 34 the support can be slid laterally outwardly of the top portion 11 and free of the same. This fulcrum bracket has openings 35 in the side walls 36 of the same adapted to receive a knife edge element 37 on which is mounted a carrier block 38. The block 38 is secured to the knife edge element 37 by a set screw 39.

Within the block 38 is a threaded opening extending transversely to the knife edge axis in which there is a manually adjustable threaded screw 40 having turning knob 41 thereon. By means of this screw the model structure 17 is connected with the carrier block 38 and the knife edge 37. Since the knife edge remains in a longitudinally fixed position in the bracket 31, the model structure will be longitudinally adjusted with respect to the knife edge when the manually adjustable screw 40 is turned.

Upon initially setting up the model structure and to balance the same without its load, the adjusting screw 40 is turned and an eye kept on the bubble device 42 carried on the model structure 17. By turning this screw 40 the weight of the model structure is shifted to one side or the other of an index point or mark 43 on block 38 corresponding in vertical alignment with the knife edge 37. The index point for the model shown should register at some point between 20 and 30 of scale indicia 43' on the model structure and preferably at 25 when unloaded. With a bubble 44 located between lines 45 and 45' of the bubble device 42, the model structure will be in perfect balance.

If the index does not register close to 25 when initially set up, an arrangement shown in Fig. 4 is employed to make the required adjustment. This arrangement consists of a container 46 adapted to fit within an opening 47 in the model structure 17. This container has an opening at one end and carries a mass of weight material 48. This weight material 48 preferably takes the form of pellets which are retained within the container 46 by a cover element 49 which is retained in place by a nut 50 threaded on a centrally disposed shaft 51 rigid with the container 46. The pellets can be removed or other pellets can be added until the proper balancing of the model structure is obtained. It should now be apparent that it is possible to balance the model structure even though the support 10 is rested on an inclined surface. If it is desired to remove the model structure from the support 10 for repair, the screws 34 of the bracket are removed and the bracket 31 with model structure is slid out of its position over the angle elements 30.

On the weight stand 21, there is disposed a plurality of weights of different sizes and shapes. These weights are proportioned according to the type of equipment or loading which the same represents. A weight 52 represents a prime mover or jeep and can be disposed on a platform 54 shown in Fig. 5. This platform 54, Fig. 5, has a pattern such as used when the airplane is being loaded to transport a task force with its equipment. When the weight 52 is positioned at 55, it represents a prime mover or four-wheel drive truck. Another weight of similar shape but of smaller size, when positioned at 56, represents a jeep, the jeep being lighter in weight by several hundred pounds than the prime mover. Both are a part of the task force equipment and are taken together. At 57 and 58 on the platform 54 there are disposed respectively other weights representative of other equipment necessary to the task force. At 59 there is disposed a weight representative of a 75 mm. gun. Personnel sit at locations 62 on the platform 54 and 63 on the main part of the model structure. Small weights 26 are used to represent personnel.

It will be noted that the model structure has two levels 64 and 65, each of which having pins 27 adapted for receiving the various weights. Intermediate the length of the model structure is an intermediate solid portion 66 to which there is connected vertically extending bracket arms 67 and 68 adapted to be fastened to the threaded screw 40 respectively at opposite ends thereof and at opposite sides of the knife edge 37. These brackets 67 and 68 also carry the bubble device 42 and the scale means 43'. The brackets are secured to the intermediate solid portion 66 of the structure by means of thru-bolts 69.

On the upper level 64 a recess 70 is provided to receive the various platforms. Each of the platforms has slots 71 and 72 adapted to be fitted about brackets 67 and 68 as the platform is inserted in the recess 70. The width of the platform is an amount shorter than the overall width of the model structure, leaving along the inner side of the model structure a portion 73 at which the locations 63 are disposed, these locations being that of the seats at the right side of the airplane.

Within the intermediate portion 66 are openings 75 adapted to receive a weight retaining element 76 having a plate 77 on its outer end. The weights are simply inserted over an upturned end 79 of the element and may be inserted into the opening 75 in mass to serve as the fuel cargo load of the airplane. The openings 75 are located in positions corresponding to the positions of these fuel tanks in the actual airplane.

Referring now to Fig. 6, there is shown a platform arrangement such as used when the airplane is being used for troop transport with chairs disposed along the middle of the airplane for accommodating additional personnel. These locations are at 80 of platform 81 shown in Fig. 6. This platform 81 may at any time be substituted for the platform 54 of Fig. 5 within the recess 70 on the upper level 64 of the model structure 17. The seat locations 62 are retained on this platform.

Referring now to Fig. 7, there is shown a platform 82 arranged such as when the fuselage fuel tanks are added to the airplane. The weight 83 is disposed at various locations 84 on the platform 82. Upon such long range missions a navigator's installation is made at 85 and the navigator can be seated at 86. Task force equipment 87 may be disposed at locations 88 and 89.

Referring now to Fig. 8, there is shown a platform arrangement such as used when the airplane is to be made into a hospital to transport wounded soldiers. Litters are supported at a series of locations 90 extended throughout the length of the platform, these locations being represented by laterally spaced pins. Other wounded personnel can be seated in usual seat locations 62. Even though the litters themselves are stretched across locations 90, one weight 92 properly located at 93 serves to represent the entire set of litter supports. Task force loading equipment can be positioned throughout the airplane and represented by weights 94 and 95 located respectively at 96 and 97. After one of the platforms with its weights has been added to the main part of the model structure, and other weights have been distributed on the upper and lower levels 64 and 65, the adjusting screw 40 is turned until the bubble 44 is properly centered between lines 45 and 45'. If the index point 43 is then found to fall outside the permissible center of gravity range from 20 to 30, a readjustment of the load must take place. These readings are in terms of percent of mean aerodynamic chord.

It should now be apparent that there has been provided a device which can be quickly loaded and unloaded with the proportionate weights where the loading condition has already been decided upon, and it is simply necessary that one of the prearranged platforms representing this condition be disposed in the recess 70 on the upper level 64 of the model structure. With basic weights already disposed on the platform any departure from the arrangement of these basic weights can be made by simply adding or taking away small weights. It should also be apparent that the arrangement is one which can be carried in the airplane and set up within the same for use since it is unnecessary that the bottom portion 12 of its support be rested upon a horizontal surface.

While various changes may be made in the detail construction, it shall be understood that such changes shall be within the spirit and scope of the present invention as defined by the appended claims.

I claim as my invention:

1. In a balance indicator, a model structure of proportionate weight and center of gravity location of an actual airplane to be loaded with cargo and personnel, said model structure having space locations and a bubble level device, proportionate weights representative of the cargo and personnel and adapted to be disposed in the space locations, indicia means on the model structure for indicating the center of gravity location, a fulcrum support, pivot means adapted to be balanced on the fulcrum support, said pivot means having a threaded opening extending transversely of its pivot axis, a manually adjustable screw operable within the threaded opening, said model structure carried on the manually adjustable screw whereby the loaded model structure can be balanced as indicated by the bubble device and the center of gravity reading made on the indicia means.

2. In a balance indicator, a model structure of proportionate weight and center of gravity location of an actual airplane to be loaded with cargo, means including a threaded element and a fulcrum for pivotally supporting said model structure in a normally balanced condition in a position corresponding to the normal position of said airplane in level flight, indicia means for indicating the center of gravity location of said model structure, said model structure having spaced station locations, and means for weighting said model structure at said station locations to simulate variations in the weight and in the distribution of the weight of said cargo, said threaded element being rotatable to bodily adjust said model structure with relation to said fulcrum to counterbalance any unbalancing caused by said weighting, whereby a reading of the center of gravity location may be made on said indicia means.

3. In a balance indicator for determining the center of gravity position of a vehicle within a permissible range of center of gravity shift for any one of a number of load distribution conditions, a model which is proportionate as to weight and center of gravity location with the vehicle and on which proportionate vehicle load conditions may be produced, a pivot forming support, a member pivoted on said support, bracket arms on said model, a model carrier block fixed on said pivoted member, said carrier block having an index point thereon, a threaded element rotatably mounted in said bracket arms and threadedly engaging said carrier block to suspend said model for movement in a plane transverse to the axis of said pivoted member whereby said loaded model may be adjusted bodily to a balanced position, level means for indicating the balanced position of said model, and a scale means arranged on said bracket arms for cooperation with the said carrier block index point upon threading rotation of said threaded element in said carrier block thereby directly indicating the center of gravity location of said model and hence of the vehicle with respect to the permissible range of center of gravity shift when said model attains a balanced position.

JAMES H. HUTTON.